United States Patent
Lor et al.

(10) Patent No.: US 9,055,390 B2
(45) Date of Patent: Jun. 9, 2015

(54) APPARATUS, SYSTEM, AND METHOD FOR PEER GROUP FORMATION FOR MOBILE DEVICES BY PROXIMITY SENSING

(71) Applicants: Kar-Wing Edward Lor, Kowloon (HK); Ho Pong Sze, Ma On Shan (HK)

(72) Inventors: Kar-Wing Edward Lor, Kowloon (HK); Ho Pong Sze, Ma On Shan (HK)

(73) Assignee: Hong Kong Applied Science and Technology Research Institute Co., Ltd., Shatin (HK)

( * ) Notice: Subject to any disclaimer, the term of this patent is extended or adjusted under 35 U.S.C. 154(b) by 126 days.

(21) Appl. No.: 13/656,023

(22) Filed: Oct. 19, 2012

(65) Prior Publication Data
US 2014/0112200 A1    Apr. 24, 2014

(51) Int. Cl.
H04W 84/18    (2009.01)
H04W 8/00     (2009.01)
H04W 76/02    (2009.01)
H04W 4/00     (2009.01)

(52) U.S. Cl.
CPC .............. *H04W 8/005* (2013.01); *H04W 76/02* (2013.01); *H04W 4/008* (2013.01); *H04W 84/18* (2013.01)

(58) Field of Classification Search
CPC ................................ H04W 76/02; H04W 4/008
USPC .......... 370/255, 312, 346, 254, 328; 455/411, 455/410, 41.1, 41.2, 414.1
See application file for complete search history.

(56) References Cited

U.S. PATENT DOCUMENTS

| 7,562,123 | B2* | 7/2009 | Reich et al. ................... 709/208 |
| 7,657,255 | B2* | 2/2010 | Abel et al. ................ 455/414.1 |
| 7,801,100 | B2* | 9/2010 | Agardh et al. ................ 370/338 |
| 7,911,338 | B2* | 3/2011 | Naeve et al. ............ 340/539.23 |
| 8,060,018 | B2* | 11/2011 | Davis et al. ................... 455/41.3 |
| 8,254,301 | B2* | 8/2012 | Chen et al. ................... 370/315 |
| 8,341,248 | B2* | 12/2012 | Hong et al. ................... 709/220 |
| 2007/0019616 | A1* | 1/2007 | Rantapuska et al. .......... 370/352 |
| 2007/0273583 | A1* | 11/2007 | Rosenberg .................... 342/367 |
| 2008/0172491 | A1* | 7/2008 | Chhabra et al. ............... 709/227 |
| 2008/0219227 | A1 | 9/2008 | Michaelis |
| 2009/0005005 | A1* | 1/2009 | Forstall et al. ................ 455/411 |

(Continued)

FOREIGN PATENT DOCUMENTS

CN    101253699    8/2008
CN    101682842    3/2010

(Continued)

OTHER PUBLICATIONS

"Introduction to NFC," from Forum Nokia, Section 3.2.2 and Section 4.3., Jul. 8, 2011, Version 1.1, 34 pages.

(Continued)

*Primary Examiner* — Rasheed Gidado
(74) *Attorney, Agent, or Firm* — Norton Rose Fulbright US LLP

(57) ABSTRACT

The present invention includes apparatuses, systems, and methods for peer group formation for mobile devices by proximity sensing. The described embodiments further include methods, systems, and apparatuses configured to easily establish an ad-hoc peer network in which each of the devices in the network automatically discovers and is connected to other devices in the network upon establishing a connection with at least one member of the ad-hoc network. The connection is established using a tap of NFC devices in the two wireless devices. Further, the wireless devices in the ad-hoc network may be divided into logical peer groups.

19 Claims, 7 Drawing Sheets

(56) References Cited

U.S. PATENT DOCUMENTS

2009/0171180 A1* 7/2009 Pering et al. .................. 600/372
2012/0176239 A1* 7/2012 Preden et al. ............ 340/539.17

FOREIGN PATENT DOCUMENTS

WO  WO 2007 061573     5/2007
WO  WO 2008 150279    12/2008

OTHER PUBLICATIONS

Office Action issued for Chinese Patent Application No. 201210552278.0, dated Sep. 30, 2014, with English language translation, 5 pages.

\* cited by examiner

US 9,055,390 B2

APPARATUS, SYSTEM, AND METHOD FOR PEER GROUP FORMATION FOR MOBILE DEVICES BY PROXIMITY SENSING

TECHNICAL FIELD

The present invention relates generally to wireless networking and, more particularly, to apparatuses, systems, and methods for peer group formation for mobile devices by proximity sensing.

BACKGROUND OF THE INVENTION

There are many types of wireless networks available for data communication, including wireless Local Area Networks (wLANs) and mesh networks that operate according to protocols such as IEEE 802.11x, cellular data networks that operate according to protocols such as Long Term Evolution (LTE) 3G/4G, and the like. Additionally, there are several types of peer-to-peer (p2p) networks that operate according to protocols such as Bluetooth. Additionally, ad-hoc wireless networking protocols exist to create peer networks that may be independent of any data connections that are external to the ad-hoc network. Ad-hoc networks are generally established to share network resources, such as a connection to the interne, software applications, or printers hosted by one of the devices in the ad-hoc network.

Ad-hoc networks can be of particular use in mobile applications. For example, in a school setting students using computing devices may need to interact with one another, but may not require access to any external networks. In such situations, ad-hoc networks may be ideal because of the flexibility, security, and simplicity offered. Unfortunately, it may be difficult, confusing, or time consuming to establish ad-hoc networks, which may be a drawback particularly in a school setting where young children may lack the experience or technological know-how to be able to easily connect their device to an ad-hoc network.

FIG. 1 illustrates a typical ad-hoc network 100. As illustrated, the ad-hoc network 100 includes two or more wireless devices 102a-d. Typically, each wireless device 102a-d connects to the ad-hoc network independently to establish a communication link 104 with each of the other wireless devices 102a-d in the ad-hoc network 100. In general, each wireless device 102a-d in the ad-hoc network must independently establish an independent communication line 104 with each other wireless device 102a-d in the network 100. This can be a very complex and time-consuming process.

One prior solution to this problem includes use of Near Field Communication (NFC) devices to simplify the network setup process. For example, one prior solution allows a user to communicate ad-hoc setup and configuration information with another wireless network device simply by tapping the devices together, or bringing them within sufficient proximity to allow communication between the NFC devices. The NFC devices communicate the network setup information and the ad-hoc network setup process is automated, at least to some degree. Unfortunately, several drawbacks still exist with this system. For example, each device must tap each and every other device in the ad-hoc network in order to establish a link with each wireless device 102a-d in the network. By way of example, in order for wireless network device 102a to establish ad-hoc network link 104 with each of wireless devices 102b-d, the user must tap wireless device 102a with each of wireless devices 102b-d in order to fully establish the wireless ad-hoc network 100. Additionally, there has not been any way of dividing wireless devices 102a-d on ad-hoc network into logical groups.

BRIEF SUMMARY OF THE INVENTION

The present invention includes apparatuses, systems, and methods for peer group formation for mobile devices by proximity sensing. The described embodiments further include methods, systems, and apparatuses configured to easily establish an ad-hoc peer network in which each of the devices in the network automatically discovers and is connected to other devices in the network upon establishing a connection with at least one member of the ad-hoc network. The connection is established using a tap of NFC devices in the two wireless devices. Further, the wireless devices in the ad-hoc network may be divided into logical peer groups.

In one embodiment, a first wireless device is configured to create or connect to a wireless network and initiate a peer group. The first wireless device also advertises its own network configuration and group information via its NFC adapter.

A second wireless device may be configured to detect the first wireless device and retrieve the network configuration and group information from the first wireless device using its own NFC adapter. The second wireless device may then connect to the wireless network in accordance with the network configuration and group information retrieved from the first wireless device. In a particular embodiment, the second device may join the peer group according to the retrieved peer group information and in accordance to a P2P protocol. The second wireless device may then store the network configuration information and pass it along to any other wireless device which may be tapped on the second wireless device.

In a further embodiment, the network configuration and group information may include information describing all peers in the group, which may facilitate automatic discovery and connection between all members of the group.

In a further embodiment, the network configuration information may include a device identifier. The network configuration information may also include a network identifier. In a further embodiment, the network configuration information may include a timestamp describing the time at which the device joined the network. The time stamp may be used to establish an order in which each of the wireless devices joined the ad-hoc network. In still a further embodiment, the network configuration may include an identifier describing the physical network, such as a WiFi SSId. The group information may include a logical network identifier, such as a P2P group identifier.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
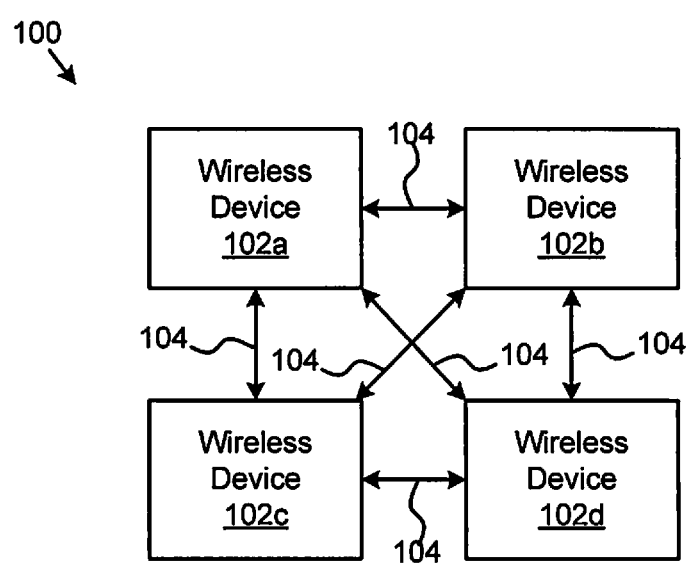
FIG. 1 is a schematic diagram illustrating one embodiment of an ad-hoc wireless network according to the prior art.
Figure 2:
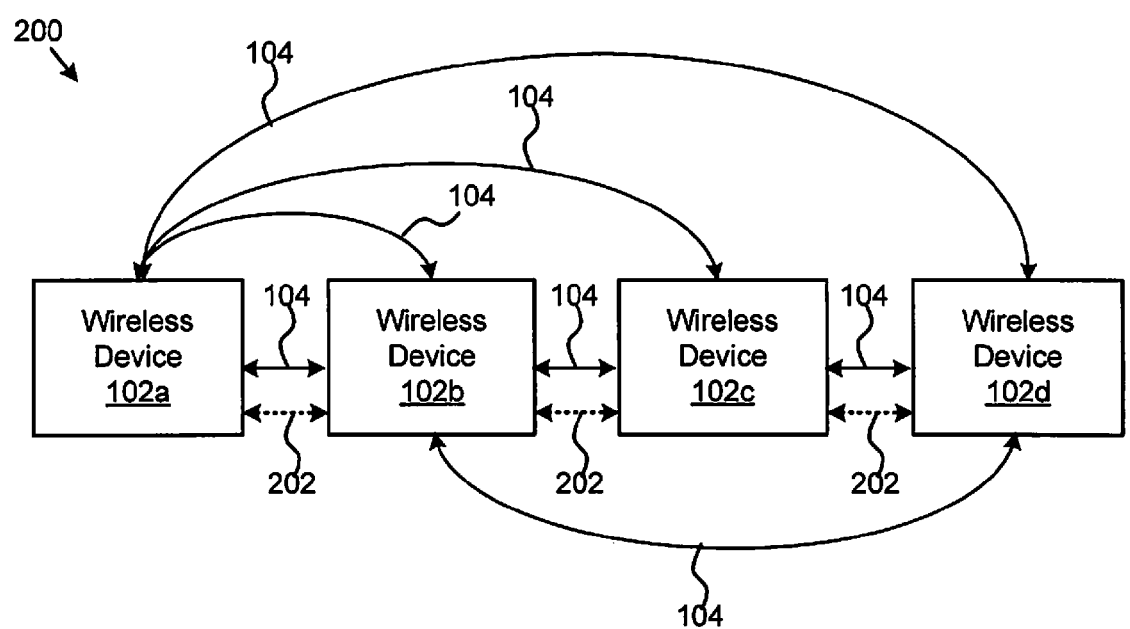
FIG. 2 is a schematic block diagram of one embodiment of a system for peer group formation for mobile devices by proximity sensing.

FIG. 2 illustrates one embodiment of system 200 for peer group formation for mobile devices by proximity sensing. In system 200, wireless devices 102a-d are configured to communicate via ad-hoc wireless data link 104. In addition, wireless devices 102a-d may establish wireless data links 104 using NFC links 202. For example, a first NFC link 202 may be established when wireless device 102b is brought into proximity or touched to wireless device 102a. Wireless devices 102a and 102b may communicate network configuration information via NFC link 202. An ad-hoc network link may then be established between wireless device 102a and wireless device 102b in accordance with the network configuration information communicated via NFC link 202.

In one embodiment, the network configuration information may include a physical network identifier. For example, a physical network identifier may include a WiFi SSID for identifying the ad-hoc network. The network configuration information may also include a broadcast network identifier. In certain embodiments, the broadcast network identifier may include an IP multicast network identifier for restricting a scope of message broadcasts. In still a further embodiment, the network configuration information may include a logical network identifier. For example, the logical network identifier may include a peer group identifier for identifying a logical group of peers the wireless device 102a-d is to join. The logical network identifier may be formatted, for example, according to recommendations of a P2P standard. In still a further embodiment, the NFC link 202 may communicate a timestamp associated with a time of network association.

Figure 3:
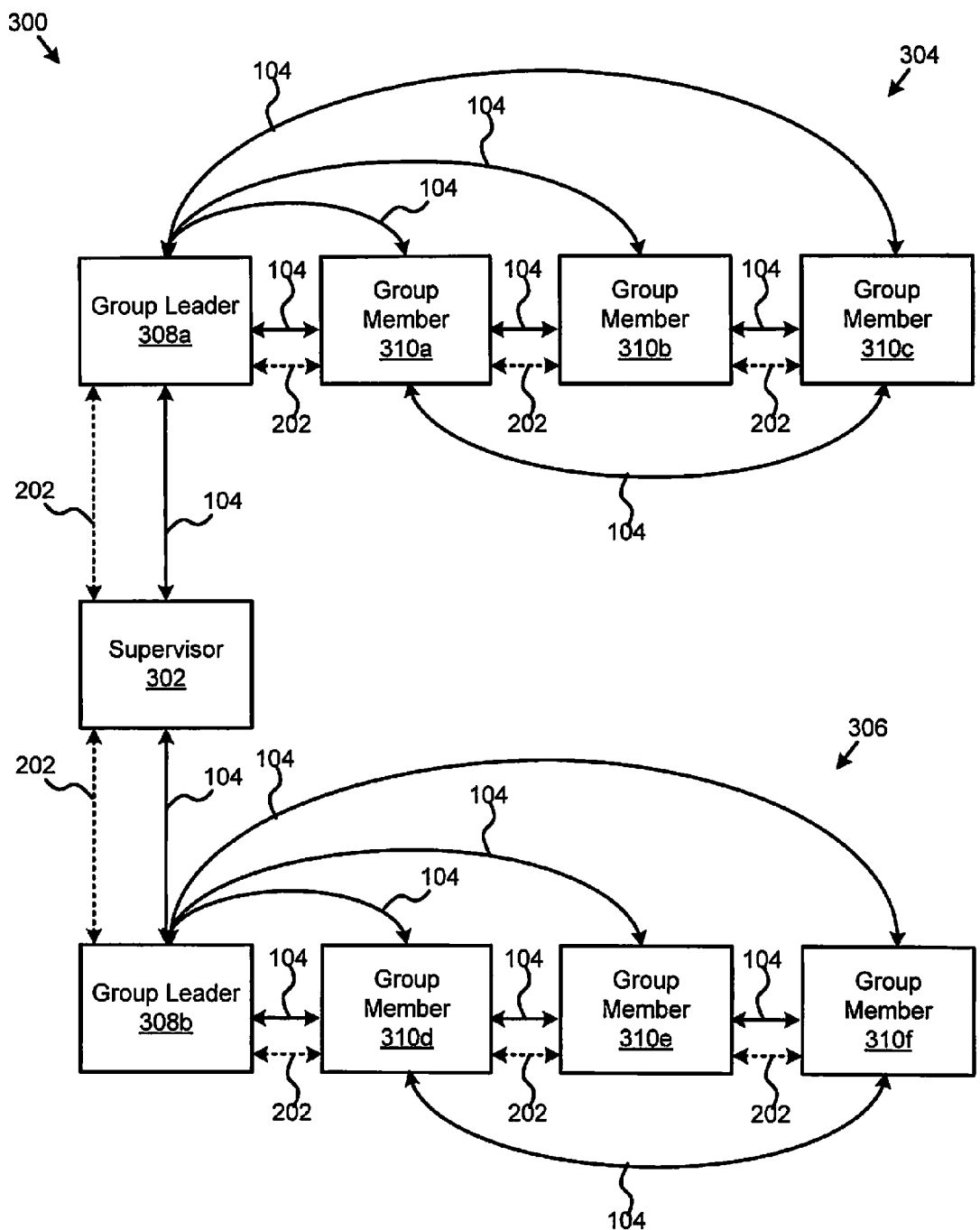
FIG. 3 is a schematic block diagram of another embodiment of a system for peer group formation for mobile devices by proximity sensing

FIG. 3 illustrates another embodiment of a system 300 for peer group formation for mobile devices by proximity sensing. System 300 illustrates how wireless devices 102 may be grouped into one or more logical groups. In particular system 300 includes a first logical group 304 and second logical group 306. Additionally, system 300 includes supervisor 302. As illustrated, first logical group 304 includes group leader 308a and group members 310a-c. Second logical group 306 includes group leader 308b and group members 310d-f. In one embodiment, supervisor 302, group leaders 308a-b, and group members 310a-f are all wireless devices 102 as described above with relation to FIG. 2. Differences between supervisor 302, group leaders 308a-b, and group members 310a-f may include software, firmware, or configuration differences causing each to perform a different role within system 300.

In one embodiment, supervisor 302 may initially hold all network configuration information, including group configuration information. Supervisor 302 may establish ad-hoc network connections with group leaders 308a-b via NFC links 202. the information communicated between supervisor 302 and group leaders 308a-b may include a physical network identifier, a broadcast network identifier, and a logical network identifier. Upon receipt of network configuration information from supervisor 302, ad-hoc network links 104 may be established between supervisor 302 and each group leader 308a-b.

In one embodiment, group leader 308a may then establish ad-hoc network links 104 with group members 310a-c by communicating the network configuration received from the supervisor 302 to the group members via NFC links 202. In one embodiment, group leader 308a may directly establish the adhoc networks by tapping with each group member 310a-c individually. Alternatively, group leader 308 may first establish a link with group member 310a. Then, group member 310a may pass the network configuration information along to group member 310b. Similarly, group member 310b may pass the network configuration information along to group member 310c though a separate NFC link 202. In such an embodiment, each group member 310a-c may communicate updated network topology information back along the chain to group leader 308a and group leader 308a may similarly communicate the updated network topology information to supervisor 302. Also, supervisor 302 and group leader 308a may similarly push updated network topology information to each group member 310a-c. Alternatively, each group member may pull the updated network topology information from group leader 308a. According to such embodiments, the network topology information may be automatically updated and distributed to each member of the physical network or group, depending on the network configuration.

In one embodiment, the network topology information may include a timestamp corresponding to the time each group leader 308a-b, or group member 310a-f joins the network. Thus an order chronological order of joining the network may be established. The topology and timing information may be communicated to the entire network 300 or alternatively restricted to each group 304, 306.

In one embodiment, the network configuration information may include a broadcast network identifier. The broadcast network identifier may be, for example, an IP multicast identifier for limiting the scope of communications within the network. Thus, according to such an embodiment, group member 310c may be allowed to communicate within group 304 to each of group members 310a-b and group leader 308a, but may not be allowed to communicate with any of the devices in the second group 306. Similarly, group member 310e may be allowed to communicate to group members 310d,f, and with group leader 308b, but may not be allowed to communicate with any of the members of the first group 304. In one embodiment, supervisor 302 may be configured to receive all communications from both the first group 304 and the second group 306. In a further embodiment, the group members may be divided into various combinations of logical groups. For example, the logical grouping may be defined as follows where the bracketed numbers indicate the annotation number of devices within the same logical group: {308a, 302 and 308b}, {308a, 310a, 310b, 310c} and {308b, 310d, 310e, 301f}. In another embodiment, the logical grouping may be as follows: {308a, 302, 308b}, {302, 308a, 310a, 310b, 310c} and {302, 308b, 310d, 310e, 301f}. One of ordinary skill in the art may recognize a variety of logical groupings that fit any particular application of the present embodiments.

Figure 4:
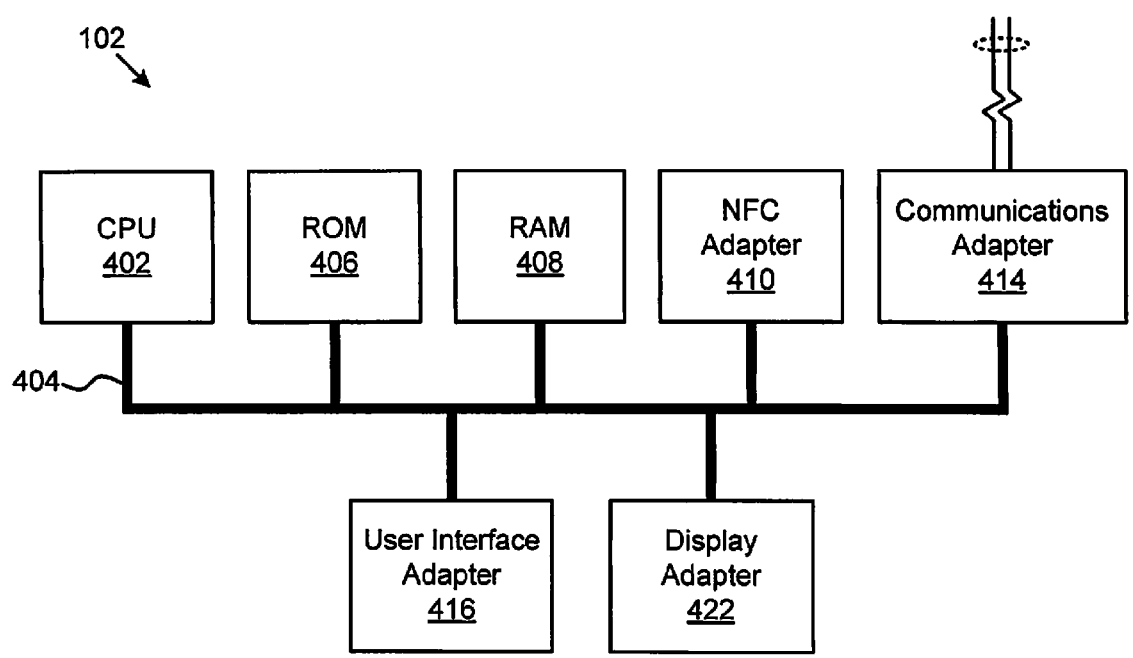
FIG. 4 is a schematic block diagram of one embodiment of an apparatus configurable for peer group formation for mobile devices by proximity sensing.

FIG. 4 illustrates one embodiment of an apparatus configurable for peer group formation for mobile devices by proximity sensing. In one embodiment, the apparatus is wireless device 102. As described, wireless device 102 may include Central Processing Unit (CPU) 402 which is coupled to data bus 404. Data bus 404 may also be coupled to Read Only Memory 406, Random Access Memory 408, NFC adapter 410, communications adapter 414, user interface adapter 416, and display adapter 422. One of ordinary skill in the art will recognize that various embodiments may exist and that one or more of the components described herein may be omitted depending upon device configurations. Additionally, one or more additional components may be added according to device configurations.

CPU 404 may load boot instructions from ROM 406 and then read further instructions from RAM 408 which may be executed by CPU 404 to carry out one or more of the logical operations described herein. Specifically, CPU 404 may be configured to control operations of NFC adapter 410 to establish NFC link 202 with a remote wireless device 102, and to control communications adapter 414 causing it to establish ad-hoc network link 104 for communication of information between wireless devices 102. RAM 408 may store initial network configuration data. In one embodiment, the initial network configuration data may be default configuration data. Alternatively, the network configuration data may be custom configuration data provided via user interface adapter 416 by a user. Additionally, upon receipt of network topology and timestamp data, CPU 402 may cause such data to be stored in RAM 408 for later reference or further distribution. In one embodiment, certain information communicated over communication adapter 414 may be displayed to a user via display adapter 422. One of ordinary skill in the art will recognize that components such as RAM 408 and CPU 402 may be configured to carry out operations described below with reference to FIGS. 5-7.

Figure 5:
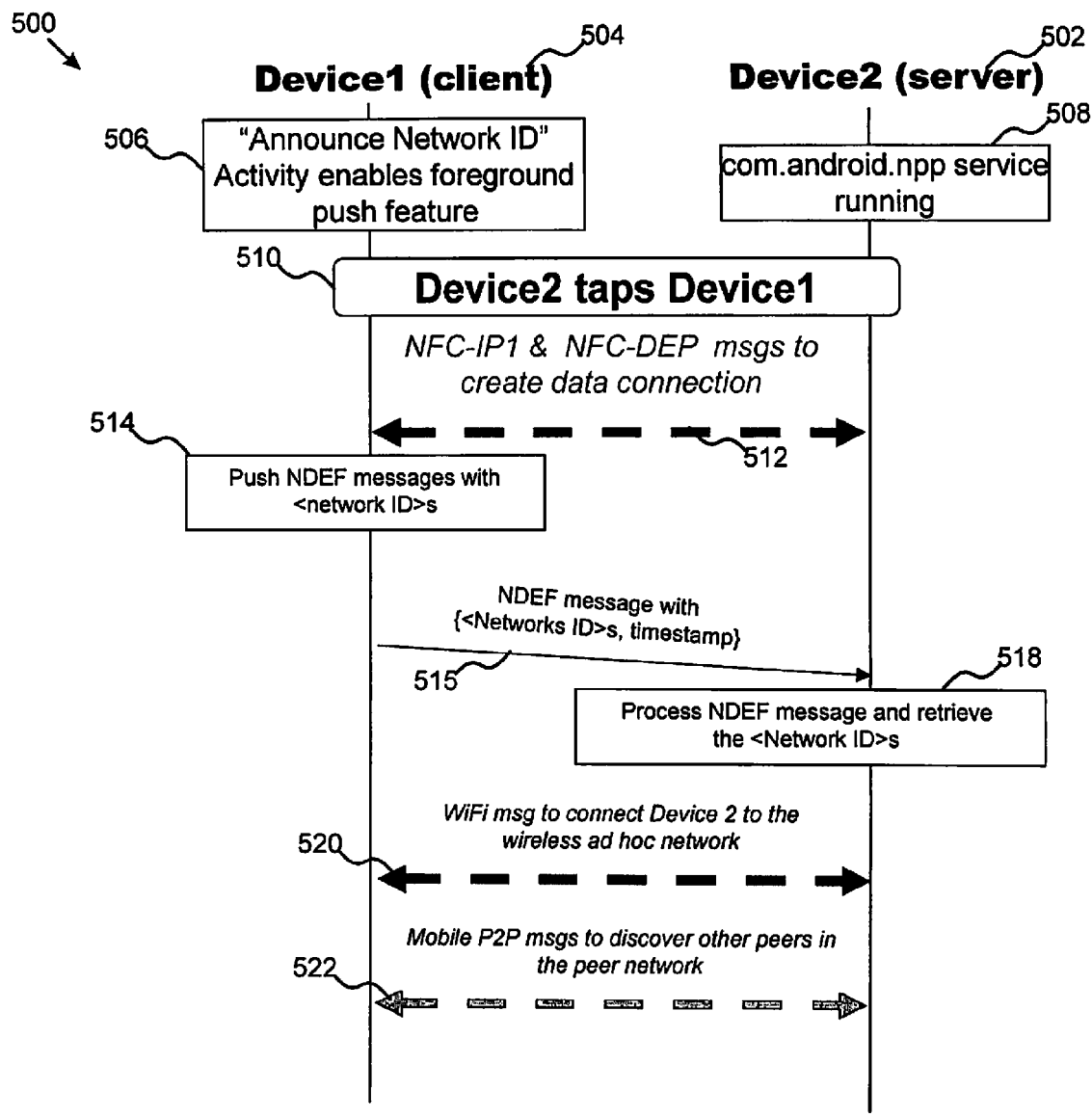
FIG. 5 is a schematic flowchart diagram illustrating one embodiment of a method for peer group formation for mobile devices by proximity sensing.

FIG. 5 illustrates one embodiment of a method 500 for peer group formation for mobile devices by proximity sensing. In one embodiment, certain steps of method 500 may be carried out by a first wireless device, e.g. 102a, and certain steps may be carried out by a second wireless device, e.g., 102b. To simplify the discussion of FIG. 5, and to illustrate the relationship between first wireless device 102a and second wireless device 102b, wireless devices 102a-b may be referred to as client 504 and server 502 respectively.

At block 506, client 504 may announce a network identifier. In one embodiment, the network identifier may be a physical network identifier. This may enable foreground push features of client 504. At block 508, server 502 may be running a communication service in CPU 402. For example, server 502 may be configured to run a com.android.npp communication service. At block 510, server 502 may tap, or be brought into proximity of, client 504. Upon tapping, NFC adapter 410 may be configured to communicate network configuration data between server 502 and client 504 as represented by line 512. At block 514, client 504 may push a request for network configuration information, including the physical network identifier as illustrated by NDEF message with timestamp at line 515. In one embodiment, the NDEF message may include a plurality of network IDs (<Network ID>). Server 502 then processes the NDEF message and retrieves the physical network identifier at block 518. At that point, the ad-hoc network data link 104 is established at line 520 and mobile P2P messages are communicated for network topology discovery and group association at line 522, via the wireless broadcast network.

Figure 6:
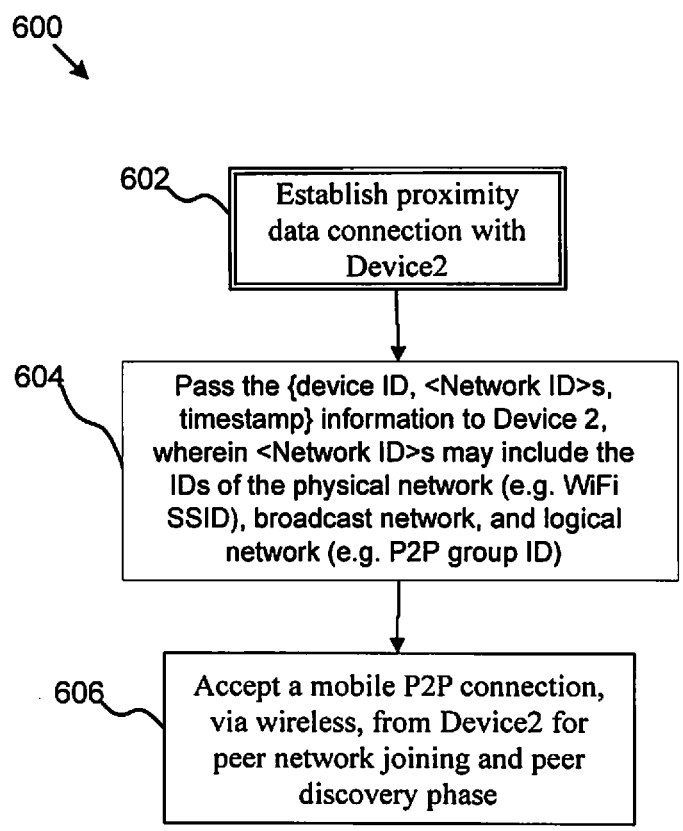
FIG. 6 is a schematic flowchart diagram illustrating one embodiment of a method for providing configuration information for peer group formation for mobile devices by proximity sensing.

FIG. 6 illustrates one embodiment of method 600 for providing configuration information for peer group formation for mobile devices by proximity sensing. At block 602, first wireless device 102a may establish an NFC link 202 with a second wireless device 102b. Then, at block 604, the network configuration information may be passed between the first wireless device 102a and the second wireless device 102b over the NFC link 202. Embodiments of the network configuration information are illustrated in block 604 of FIG. 6. In particular, the network configuration information may include one or more of a physical network ID, a broadcast network ID, and a logical (peer-to-peer) network ID. Finally, at block 606, a mobile P2P connection may be accepted via the ad-hoc data link 104 by the second wireless device 102b and the peer discovery phase may be initiated.

Figure 7:
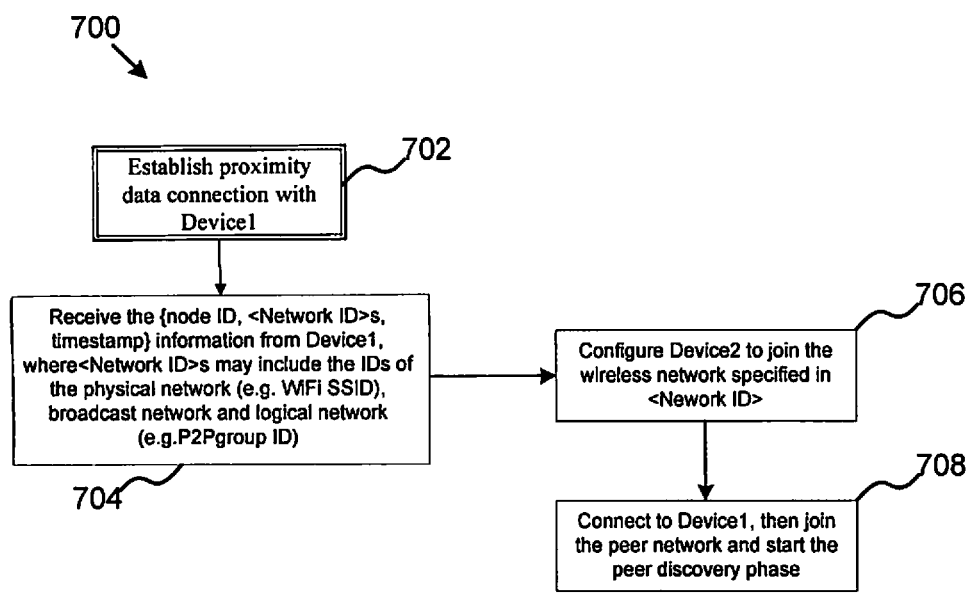
FIG. 7 is a schematic flowchart diagram illustrating one embodiment of a method for obtaining configuration for peer group formation for mobile devices by proximity sensing.

FIG. 7 illustrates one embodiment of method 700 for obtaining configuration for peer group formation for mobile devices by proximity sensing. At block 702, second wireless device 102b may establish an NFC link 202 with first wireless device 102a. Then, at block 704 the network configuration data, including at least one of a physical network ID, a broadcast network ID, and a logical network ID, may be exchanged. At block 706 the second wireless device 102b may be configured to join wireless ad hoc network 200, 300. Once the ad-hoc network has been established, then at block 708 second wireless device 102b may connect to first wireless device 102a, join the P2P network, and initiate the peer discovery phase.

In one embodiment, the first node of a physical network (Node A) may assign bootstraps (Nodes $B_1, B_2, \ldots B_n$) of various logical networks through tapping; in these assignments through tapping, Node $B_i$ will read the same physical network ID as Node A but each Node $B_i$ may be assigned a different logical network ID $Group_i$. By tapping A, each bootstrap peer $B_i$ joins the physical network (e.g. WiFi ad hoc network), while each $B_i$ is the first peer in the logical network $Group_i$. A device joins $Group_i$ when it taps, via proximity sensor, on another peer device already in the $Group_i$, while the peer device tapped can be the bootstrap peer or any subsequent peer of that group. In one embodiment, tapping device reads the information, including the physical network ID (e.g. WiFi's SSID), broadcast network ID (e.g. IP multicast group), logical network ID (peer group ID) on the tapped device, via the proximity sensors.

In one embodiment, the logical network ID identifies at least one of a plurality of logical groups of peer wireless devices for the second wireless device to join. The each wireless device may discover all peer wireless devices in the same logical group upon joining the logical group. Similarly, each current member of the logical group discovers the newly joined wireless device when it joins the logical group. Each member of the logical group also discovers immediately when a wireless device exits the logical group. Thus, in one embodiment, communications between peer wireless devices in the same logical group may be established or modified automatically and immediately upon formation or modification of the group. In a further embodiment, the formation of the logical groups and operations of peer wireless devices within the logical groups are independent of a server.

In one embodiment, the broadcast ID may be used to set limits on communications between peer wireless devices in the logical groups. For example, broadcast communications may be limited only to those peer wireless devices within the same logical group.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   transmitting, by a wireless device, network configuration information to a remote wireless device via a proximity sensor, wherein the network configuration information includes information suitable for establishing a mobile ad hoc wireless network between a plurality of wireless devices, wherein the proximity sensor is a near field communication (NFC) adapter, and wherein the network configuration information is transmitted to the remote wireless device via the proximity sensor when the remote wireless device is touched to the wireless device;
   receiving, by the wireless device, a request to establish the mobile ad hoc wireless network from the remote wireless device;
   establishing, by the wireless device, the ad hoc wireless network with the remote wireless device according to the network configuration communicated to the remote wireless device via the proximity sensor;
   automatically discovering, by the wireless device, information associated with one or more peer wireless devices coupled to the ad hoc network;
   where the network configuration information comprises the information associated with the one or more peer wireless devices coupled to the ad hoc network; and
   establishing, independent of a server, one or more logical groups of peer wireless devices, within the mobile ad hoc wireless network, in accordance with the network configuration information,
   wherein the remote wireless device transmits the network configuration information received from the wireless device to another remote wireless device of the plurality of wireless devices when the other wireless device is touched to the remote wireless device, wherein the other remote wireless device joins the ad hoc wireless network using the network configuration information received from the remote wireless device, and wherein the one or more logical groups of peer wireless devices are formed independent of the server based on a particular peer wireless device that provided the configuration information to each of the one or more peer wireless devices.

2. The method of claim 1, further comprising transmitting a physical network identifier to the remote device via the proximity sensor, where the physical network identifier is configured to enable the remote wireless device to identify and join a physical ad hoc network.

3. The method of claim 1, further comprising transmitting a broadcast network identifier to the remote device via the proximity sensor, where the broadcast network identifier is configured to enable the remote wireless device to identify a group of wireless devices to receive data messages from the remote wireless device.

4. The method of claim 1, further comprising transmitting a logical network identifier to the remote device via the proximity sensor, where the logical network identifier is configured to enable the remote wireless device to identify and join a logical group of wireless devices.

5. The method of claim 1, further comprising receiving a timestamp from the remote wireless device associated with a time at which the remote wireless device joined the ad hoc wireless network.

6. The method of claim 5, further comprising establishing a chronological order in which the plurality of wireless devices join the ad hoc wireless network in response to receiving a timestamp associated with each of the wireless network devices.

7. An apparatus comprising:
   a proximity sensor configured to:
      transmit network configuration information, the network configuration information comprising information suitable for establishing a mobile ad hoc wireless network between a plurality of wireless devices, wherein the proximity sensor is a near field communication (NFC) adapter, and wherein the network configuration information is transmitted to a remote wireless device when the apparatus is touched to the wireless device; and
      receive a request to establish the mobile ad hoc wireless network from the remote wireless device;
   a wireless communication adapter configured to establish the ad hoc wireless network with the remote wireless device according to the network configuration communicated to the remote wireless device via the proximity sensor;
   a processor configured to automatically discover network topology information in response to topology information associated with one or more peer wireless devices coupled to the ad hoc network and automatically communicated to the processor from the remote wireless device;
   where the network configuration information comprises the information associated with the one or more peer wireless devices coupled to the ad hoc network; and
   a processor configured to establish, independent of a server, one or more logical groups of peer wireless devices, within the mobile ad hoc wireless network, in accordance with the network configuration information,
   wherein the remote wireless device transmits the network configuration information received from the wireless device to another remote wireless device of the plurality of wireless devices when the other wireless device is touched to the remote wireless device, wherein the other remote wireless device joins the ad hoc wireless network using the network configuration information received from the remote wireless device, and wherein the one or more logical groups of peer wireless devices are formed based on a particular peer wireless device that provided the configuration information to each of the one or more peer wireless devices.

8. The apparatus of claim 7, where the proximity sensor is further configured to transmit a physical network identifier to the remote device via the proximity sensor, where the physical network identifier is configured to enable the remote wireless device to identify and join a physical ad hoc network.

9. The apparatus of claim 7, where the proximity sensor is further configured to transmit a broadcast network identifier to the remote device via the proximity sensor, where the broadcast network identifier is configured to enable the remote wireless device to identify a group of wireless devices to receive data messages from the remote wireless device.

10. The apparatus of claim 7, where the proximity sensor is further configured to transmit a logical network identifier to the remote device via the proximity sensor, where the logical network identifier is configured to enable the remote wireless device to identify and join a logical group of wireless devices.

11. The apparatus of claim 7, further comprising a processor configured to receive a timestamp from the remote wireless device associated with a time at which the remote wireless device joined the ad hoc wireless network.

12. The apparatus of claim 11, wherein the processor is further configured to establish a chronological order in which the plurality of wireless devices join the ad hoc wireless network in response to receiving a timestamp associated with each of the wireless network devices.

13. An apparatus comprising:
a proximity sensor configured to:
receive network configuration information transmitted by a remote wireless device, wherein the proximity sensor is a near field communication (NFC) adapter, wherein the network configuration information is transmitted by the remote wireless device when touched by the apparatus, the network configuration information comprising information suitable for establishing a mobile ad hoc wireless network between a plurality of wireless devices; and
transmit a request to establish the mobile ad hoc wireless network with the remote wireless devices;
a wireless communication adapter configured to establish the ad hoc wireless network with the remote wireless device according to the network configuration received from the remote wireless device via the proximity sensor; and
a processor configured to establish, independent of a server, one or more logical groups of peer wireless devices, within the mobile ad hoc wireless network, in accordance with the network configuration information,
wherein the apparatus transmits the network configuration information received from the remote wireless device to another wireless device of the plurality of wireless devices when the other wireless device is touched to the apparatus, wherein the other wireless device joins the ad hoc wireless network using the network configuration information received from the apparatus, and wherein the one or more logical groups of peer wireless devices are formed based on a particular peer wireless device that provided the configuration information to each of the one or more peer wireless devices.

14. A system comprising:
a first wireless device configured to transmit network configuration information over a proximity sensor, wherein the proximity sensor is a near field communication (NFC) adapter, wherein the network configuration information is transmitted by the first wireless device when touched by a second wireless device, the network configuration information comprising information suitable for establishing a mobile ad hoc wireless network between a plurality of wireless devices, and the second wireless device configured to receive the network configuration information and to establish the ad hoc wireless network with the first wireless device in response to the network configuration information received from the first wireless device over the proximity sensor, and wherein the second wireless device is further configured to join a logical group of peer wireless devices, within the mobile ad hoc wireless network, in response to a logical network identifier included in the network configuration information, wherein formation of the logical group and operations of the peer wireless devices within the logical group are independent of a server,
wherein the second wireless device transmits the network configuration information to a third wireless device of the plurality of wireless devices when the third wireless device is touched to the second wireless device, wherein the third wireless device joins the ad hoc wireless network using the network configuration information received from the second wireless device, and wherein the one or more logical groups of peer wireless devices are formed based on a particular peer wireless device that provided the configuration information to each of the one or more peer wireless devices.

15. The system of claim 14, wherein the logical network identifier identifies at least one of a plurality of logical groups of peer wireless devices for the second wireless device to join.

16. The system of claim 15, wherein the second wireless device discovers all peer wireless devices in the same logical group upon joining the logical group.

17. The system of claim 15, wherein each of the peer wireless devices in the logical group discovers the second wireless device in response to the second wireless device joining the logical group.

18. The system of claim 15, wherein each of the peer wireless devices in the logical group discovers when a peer wireless devices of the logical group exits the logical group.

19. The system of claim 15, wherein broadcast communications of the second wireless device are limited only to those peer wireless devices within the same logical group.

* * * * *

UNITED STATES PATENT AND TRADEMARK OFFICE
CERTIFICATE OF CORRECTION

PATENT NO.        : 9,055,390 B2                                       Page 1 of 1
APPLICATION NO.   : 13/656023
DATED             : June 9, 2015
INVENTOR(S)       : Kar-Wing Edward Lor et al.

It is certified that error appears in the above-identified patent and that said Letters Patent is hereby corrected as shown below:

In the Specification:
At column 1, line number 27, delete "interne" and replace with --internet--.
At column 6, line number 50, delete "Group;" and replace with --$Group_i$--.

Signed and Sealed this
Twenty-seventh Day of October, 2015

Michelle K. Lee
*Director of the United States Patent and Trademark Office*